(12) United States Patent
Law et al.

(10) Patent No.: US 11,863,545 B2
(45) Date of Patent: *Jan. 2, 2024

(54) SECURE TOKEN DISTRIBUTION

(71) Applicant: Visa International Service Association, San Francisco, CA (US)

(72) Inventors: Simon Law, San Mateo, CA (US); Kim R. Wagner, Sunnyvale, CA (US)

(73) Assignee: Visa International Service Association, San Francisco, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/152,659

(22) Filed: Jan. 10, 2023

(65) Prior Publication Data

US 2023/0155995 A1 May 18, 2023

Related U.S. Application Data

(63) Continuation of application No. 17/135,693, filed on Dec. 28, 2020, now Pat. No. 11,595,373, which is a (Continued)

(51) Int. Cl.
*H04L 9/40* (2022.01)
*H04L 9/32* (2006.01)
(Continued)

(52) U.S. Cl.
CPC ..... *H04L 63/0807* (2013.01); *G06Q 20/3672* (2013.01); *G06Q 20/3674* (2013.01);
(Continued)

(58) Field of Classification Search
None
See application file for complete search history.

(56) References Cited

U.S. PATENT DOCUMENTS 6,671,804 B1 12/2003 Kent
7,096,365 B1 8/2006 Hamann et al.
(Continued)

FOREIGN PATENT DOCUMENTS

CN 101107610 1/2008
CN 102959559 3/2013
(Continued)

OTHER PUBLICATIONS

Muftic, S., 2016. Bix certificates: Cryptographic tokens for anonymous transactions based on certificates public ledger. Ledger, 1, pp. 19-37. (Year: 2016).*
(Continued)

*Primary Examiner* — Luu T Pham
*Assistant Examiner* — Edward X Long
(74) *Attorney, Agent, or Firm* — Kilpatrick Townsend & Stockton LLP

(57) ABSTRACT

A method for utilizing a registration authority computer to facilitate a certificate signing request is provided. A registration authority computer may receive a certificate signing request associated with a token requestor. The registration authority computer may authenticate the identity of the token requestor and forward the certificate signing request to a certificate authority computer. A token requestor ID and a signed certificate may be provided by the certificate authority computer and forwarded to the token requestor. The
(Continued)

token requestor ID may be utilized by the token requestor to generate digital signatures for subsequent token-based transactions.

16 Claims, 9 Drawing Sheets

Related U.S. Application Data continuation of application No. 15/369,488, filed on Dec. 5, 2016, now Pat. No. 10,911,429.

(60) Provisional application No. 62/263,503, filed on Dec. 4, 2015.

(51) Int. Cl.
*G06Q 20/36* (2012.01)
*G06Q 20/38* (2012.01)

(52) U.S. Cl.
CPC ... *G06Q 20/3825* (2013.01); *G06Q 20/38215* (2013.01); *H04L 9/3247* (2013.01); *H04L 9/3268* (2013.01); *H04L 63/0435* (2013.01); *H04L 63/0823* (2013.01)

(56) References Cited

U.S. PATENT DOCUMENTS

| | | |
|---|---|---|
| 2002/0099668 A1 | 7/2002 | Perlman |
| 2003/0115468 A1 | 6/2003 | Aull et al. |
| 2005/0144142 A1 | 6/2005 | Takayama |
| 2006/0179298 A1 | 8/2006 | Balaz et al. |
| 2009/0274303 A1 | 11/2009 | Popp |
| 2011/0213966 A1 | 9/2011 | Fu et al. |
| 2012/0179907 A1 | 7/2012 | Byrd et al. |
| 2013/0218779 A1 | 8/2013 | Kirillin et al. |
| 2013/0297513 A1 | 11/2013 | Kirillin et al. |
| 2013/0304646 A1 | 11/2013 | De Geer |
| 2014/0164254 A1 | 6/2014 | Dimmick |
| 2015/0032627 A1 | 1/2015 | Dill et al. |
| 2015/0127547 A1 | 5/2015 | Powell et al. |
| 2015/0220917 A1 | 8/2015 | Aabye et al. |
| 2015/0269566 A1 | 9/2015 | Gaddam et al. |
| 2015/0319158 A1 | 11/2015 | Kumnick |
| 2016/0125402 A1 | 5/2016 | Lee et al. |
| 2017/0034172 A1 | 2/2017 | Biggs et al. |
| 2017/0163629 A1 | 6/2017 | Law et al. |

FOREIGN PATENT DOCUMENTS

| | | |
|---|---|---|
| CN | 104904157 | 9/2015 |
| WO | 2006028683 | 3/2006 |
| WO | 2012040377 | 3/2012 |
| WO | 2017096399 | 6/2017 |

OTHER PUBLICATIONS

Kim, J.J. and Hong, S.P., 2011. A method of risk assessment for multi-factor authentication. Journal of Information Processing Systems, 7(1), pp. 187-198. (Year: 2011).*
U.S. Appl. No. 15/369,488, "Final Office Action", dated Jan. 30, 2019, 21 pages.
U.S. Appl. No. 15/369,488 , "Final Office Action", dated Feb. 20, 2020, 26 pages.
U.S. Appl. No. 15/369,488 , "Non-Final Office Action", dated Jul. 25, 2018, 20 pages.
U.S. Appl. No. 15/369,488 , "Non-Final Office Action", dated Jul. 12, 2019, 25 pages.
U.S. Appl. No. 15/369,488 , "Notice of Allowance", dated Oct. 15, 2020, 20 pages.
CN201680068352.8 , "Notice of Decision to Grant", dated Dec. 5, 2022, 4 pages.
CN201680068352.8 , "Office Action", dated Jul. 29, 2021, 20 pages.
CN201680068352.8 , "Office Action", dated Apr. 6, 2022, 21 pages.
CN201680068352.8 , "Office Action", dated Aug. 24, 2022, 6 pages.
Fang et al., "Online Banking Authentication Using Mobile Phones", IEEE, Jun. 10, 2010, pp. 1-5.
Granjal et al., "End-To-End Transport-Layer Security for Internet-Integrated Sensing Applications with Mutual and Delegated Ecc Public-Key Authentication", IFIP Networking Conference, Jan. 2013, pp. 1-9.
Kim et al., "A Method of Risk Assessment for Multi-Factor Authentication", Journal of Information Processing, vol. 7, No. 1, Mar. 2011, pp. 187-198.
PCT/US2016/065005 , "International Preliminary Report on Patentability", dated Jun. 14, 2018, 12 pages.
PCT/US2016/065005 , "International Search Report and Written Opinion", dated Mar. 14, 2017, 15 pages.
SG11201803192W, "Notice of Decision to Grant", dated Oct. 7, 2020, 6 pages.
SG11201803192W , "Written Opinion", dated Dec. 5, 2019, 8 pages.
Thompson et al., "Certificate-Based Authorization Policy in a PKI Environment", Transactions on Information and System Security, vol. 6, No. 4, Nov. 2003, pp. 566-588.
U.S. Appl. No. 17/135,693 , "Final Office Action", dated May 11, 2022, 34 pages.
U.S. Appl. No. 17/135,693 , "First Action Interview Office", dated Dec. 8, 2021, 6 pages.
U.S. Appl. No. 17/135,693 , "First Action Interview Pilot Program Pre-Interview Communication", dated Aug. 31, 2021, 5 pages.
U.S. Appl. No. 17/135,693 , "Notice of Allowance", dated Sep. 28, 2022, 18 pages.

* cited by examiner

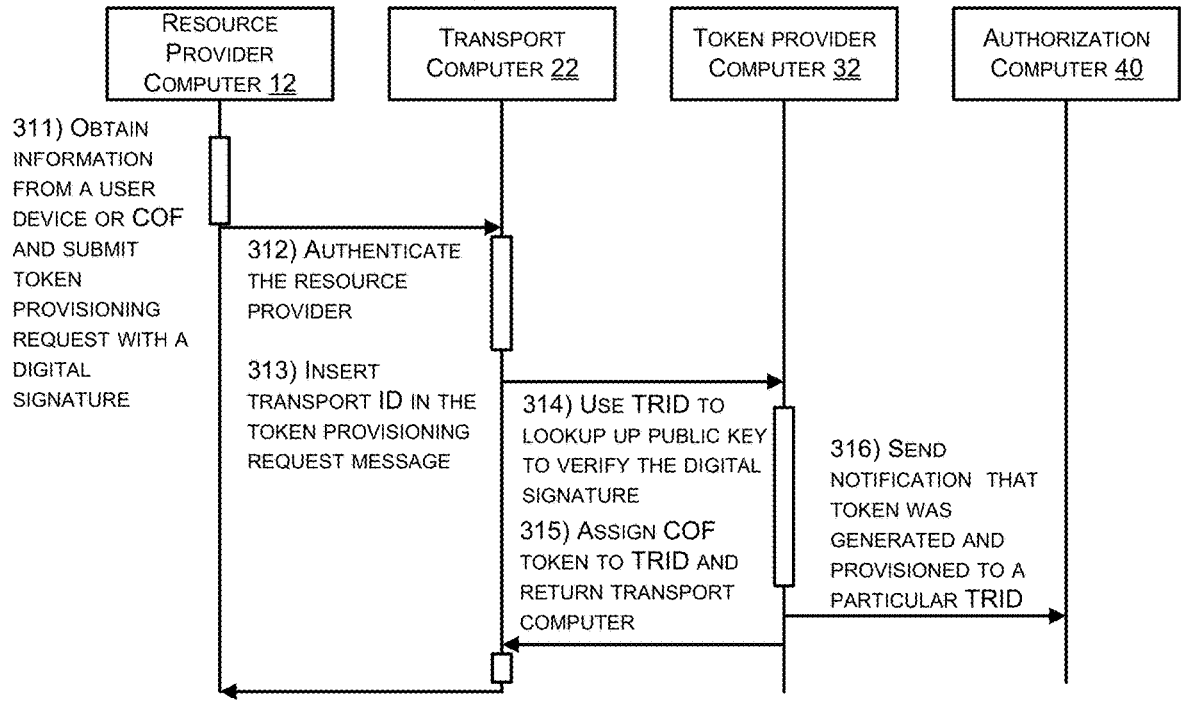
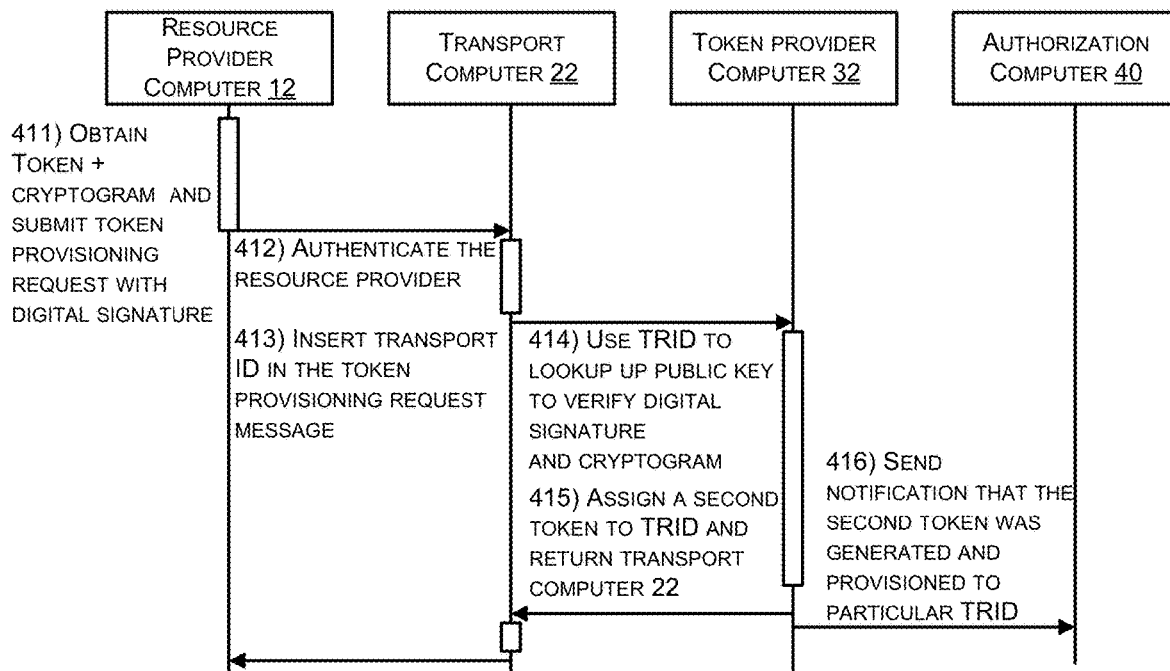

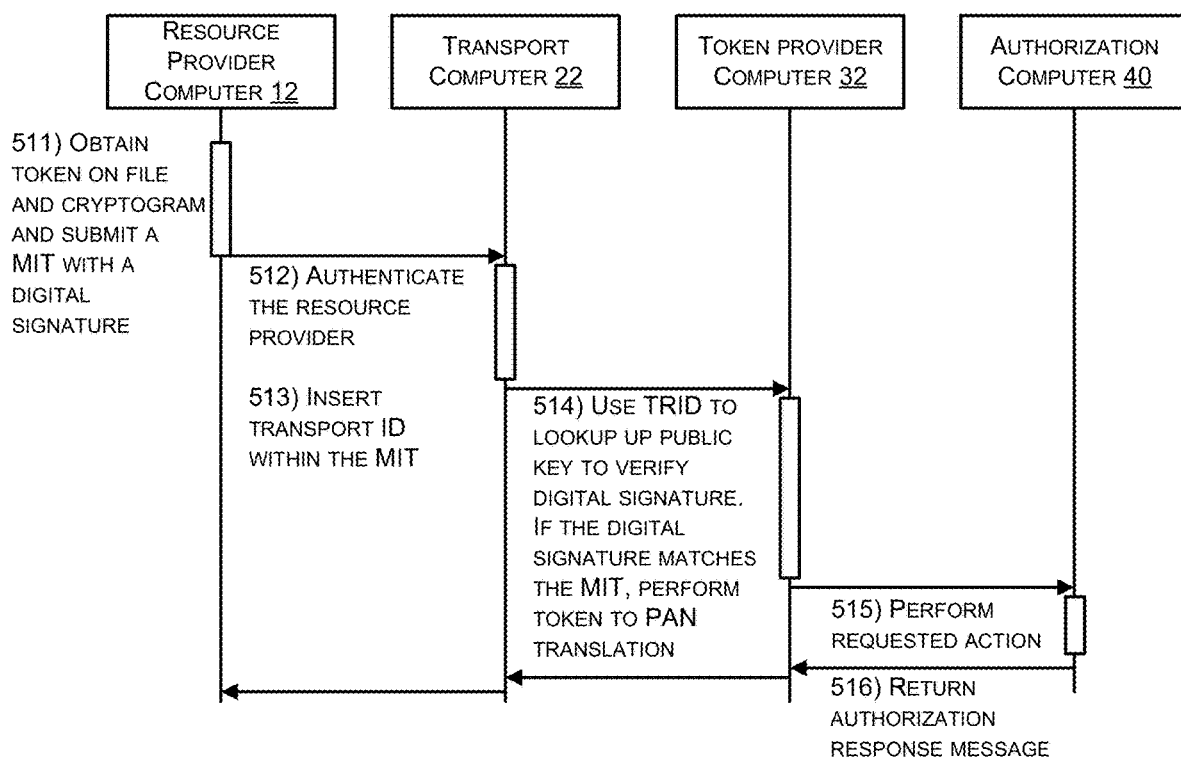

SECURE TOKEN DISTRIBUTION

CROSS-REFERENCE TO RELATED APPLICATIONS

This application is a continuation of U.S. patent application Ser. No. 17/135,693, filed Dec. 28, 2020, which is a continuation of U.S. patent application Ser. No. 15/369,488, filed Dec. 5, 2016, which claims the benefit of the filing date of U.S. Provisional Application No. 62/263,503, filed Dec. 4, 2015. The above-named applications are incorporated by reference herein in their entireties.

BACKGROUND

Tokens provide for the ability to introduce new domain controls to further enhance security within the eco-system. Some token types are categorized by how they are stored at rest (HCE (host card emulation), SE (secure element) or COF (card on file)). During each transaction a TAVV (Transaction Authentication Verification Value) is generated. The TAVV ensures that the request originates from the original token requestor (pre-authenticated entity) and the transaction is unique. Generating TAVVs outside of a secure execution environment may be difficult. In some cases, a token provider offers a service to token requestors to obtain a TAVV before submitting a token transaction. However this creates several issues for token requestors.

Requiring token requestors to obtain a TAVV creates several challenges. First, a TAVV adds extra time to reach out to a token service and wait for response to the TAVV submission. Second, authenticating to the token provider requires extra development and the storage of symmetric keys. Third, the token provider may need to create a new distribution strategy to create a direct token requestor relationship. Further, other token providers in the eco-system offer vastly different solutions.

Embodiments of the invention address these and other problems.

BRIEF SUMMARY

Embodiments of the invention are directed to token management. In particular, embodiments of the invention are directed to providing improved mechanisms for token requestors (e.g., merchants, or other token requestors such as a wallet application) to obtain a token from a token provider. In some embodiments, rather than requiring a TAVV to be generated by the token provider, the key generation effort may be moved to the token requestor. Additionally, authentication of the token requestor may be performed by entities (e.g., acquirers) other than the token provider. By utilizing such techniques the token provider's computational burden may be alleviated by relieving the token provider from generating or obtaining TAVVs.

One embodiment of the invention is directed to a method including receiving, at a registration authority computer, a certificate signing request from a token requestor computer. The method may further include authenticating, by the registration authority computer, a token requestor associated with the token requestor computer. The method may further include transmitting the certificate signing request to a certificate authority computer. The method may further include receiving, from the certificate authority computer, a token requestor identifier (ID) assigned to the token requestor and a signed certificate. The method may further include transmitting, the signed certificate and the token requestor ID to the token requestor computer. In at least one embodiment, receipt of the token requestor ID by the token requestor computer may enable the token requestor computer to generate digital signatures for subsequent token-based transactions.

Another embodiment of the invention is directed to a registration authority computer that includes a processor, and a computer readable medium coupled to the processor, the computer readable medium including code, executable by the processor, for implementing a method. The method may receive a certificate signing request from a token requestor computer. The method may further include authenticating a token requestor associated with the token requestor computer based at least in part on the certificate signing request. The method may further include transmitting the certificate signing request to a certificate authority computer. The method may further include receiving, from the certificate authority computer, a signed certificate and a token requestor identifier (ID) assigned to the token requestor. The method may further include transmitting, the signed certificate and the token requestor ID to the token requestor computer. In at least one embodiment, receipt of the token requestor ID by the token requestor computer may enable the token requestor computer to generate digital signatures for subsequent token-based transactions.

Another embodiment of the invention is directed to a method including receiving, a first payment token associated with a first token domain. The method may further include transmitting a token provisioning request message to a token provider computer using the first payment token, wherein the token provider computer generates a second payment token in response to receiving the token provisioning request message, the second payment token being associated with a second token domain that is different than the first token domain. The method may further include receiving the second payment token from the token provider computer.

These and other embodiments of the invention are described in further detail below.

BRIEF DESCRIPTION OF THE DRAWINGS

FIG. 3 shows a flowchart illustrating a token provisioning flow for a PAN.

FIG. 4 shows a flowchart illustrating a token provisioning for another token.

FIG. 5 shows a flowchart with a token processing flow.

DETAILED DESCRIPTION

Figure 1:
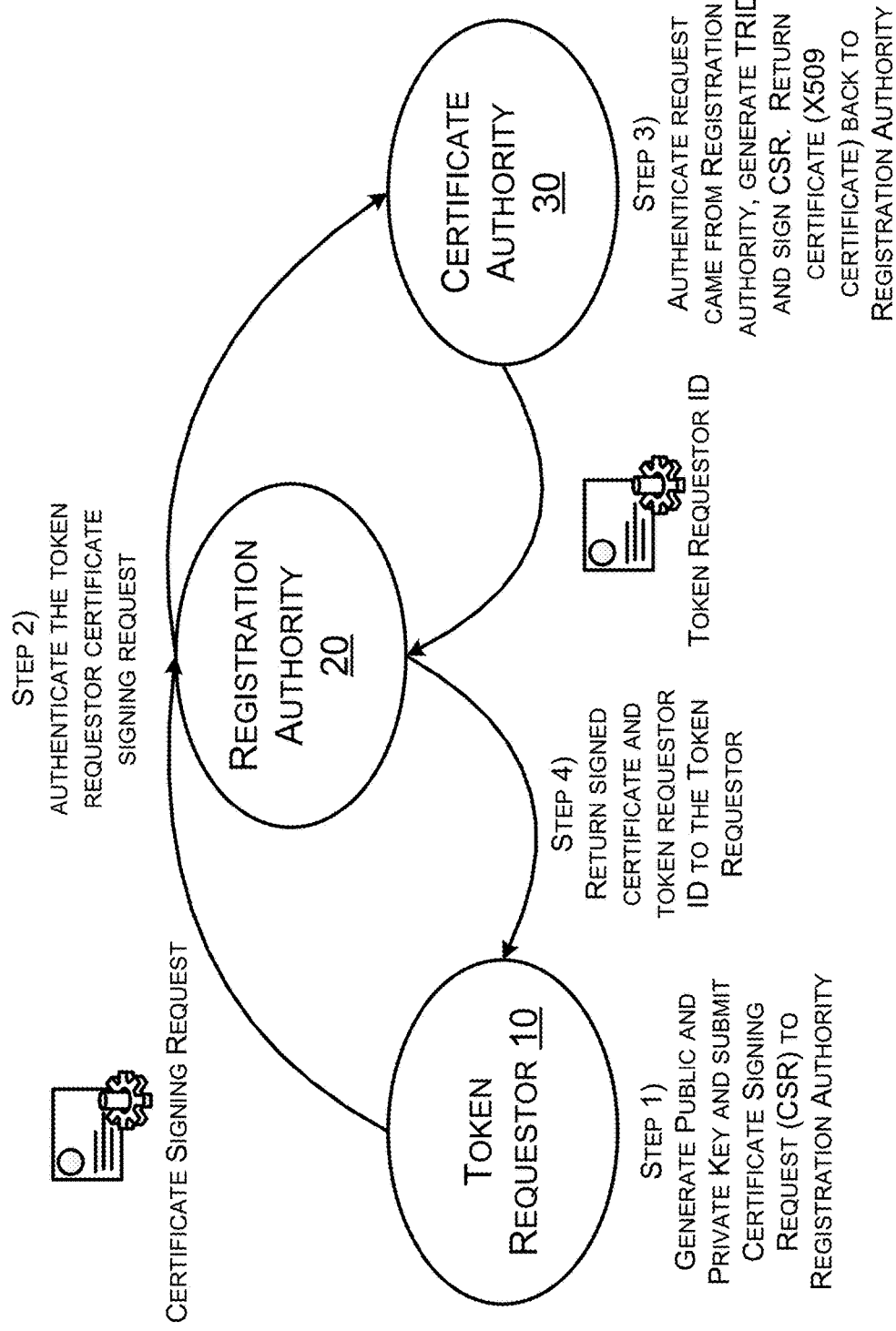
FIG. 1 shows a diagram illustrating the distribution of security credentials.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "payment token" or "token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token may be generated such that the recovery of the original PAN or other account identifier from the token value may not be computationally derived. Further, in some embodiments, the token format may be configured to allow the entity receiving the token to identify it as a token and recognize the entity that issued the token.

A "token service" can include a system that that services tokens (e.g., payment tokens). In some embodiments, a token service can facilitate requesting, determining (e.g., generating) and/or issuing tokens, as well as maintaining an established mapping of tokens to token requestor IDs (TRIDs) and/or PANs in a repository (e.g. token vault). In some embodiments, the token service may establish a token assurance level for a given token to indicate the confidence level of the token to TRID binding. The token service may include or be in communication with a token vault where the generated tokens are stored. The token service may support token processing of payment transactions submitted using tokens by de-tokenizing the token to obtain the actual PAN. In some embodiments, a token service may include a token provider computer alone, or in combination with other computers such as a payment processing network computer. Various entities of a tokenization ecosystem may assume the roles of the token provider. For example, payment networks and issuers or their agents may become the token provider by implementing the token services according to embodiments of the present invention.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

A "certificate signing request" is a block of text that is provided to a certificate authority when requesting a certificate signing. A certificate signing request may include identification information of the requestor. For example, a certificate signing request may include, but is not limited to, a legal name of the requestor (or requestor's organization), a domain name associated with the requestor, an organizational unit of the requestor (e.g., a division of the requestor's organization), a city/locality of the requestor, a state/county/region of the requestor, a country of the requestor, and email address associated with the requestor, and/or a public key of an asymmetric key pair associated with the requestor. A certificate authority (or other authentication system) may utilize the identification information included in the certificate signing request to authenticate the requestor. Additionally, a certificate authority may utilize the identification information to create/manage a certificate or a mapping that enables the certificate authority to ascertain the identity of the sender in future transactions.

A "digital signature" is a type of electronic signature that encrypts data with digital codes that are particularly difficult to duplicate. Digital signatures may be utilized to validate the authenticity and integrity of an electronic message. Digital signatures are intended to solve the problem of tampering and impersonation in digital communications. Digital signatures may provide the added assurances of evidence to origin, identity, status of an electronic transaction as well as to serve as an acknowledgement of informed consent by the signor.

"Asymmetric keys," also known as public/private key pairs, are used for asymmetric encryption. In a public-key encryption system, a device can encrypt a message using the public key of the receiver, but such a message can be decrypted only with the receiver's private key. Public-key cryptography systems often rely on cryptographic algorithms based on mathematical problems that currently admit no efficient solution. Message authentication involves hashing a message to produce a "digest," and encrypting the digest with the private key to produce a digital signature. Thereafter another device can verify this signature by 1) computing the hash of the message, 2) decrypting the signature with the signer's public key, and 3) comparing the computed digest with the decrypted digest.

A "digital wallet" refers to an electronic module that allows a device to make electronic commerce transactions. In some embodiments, a digital wallet may store account information (e.g., bank account numbers, PANs, etc.) associated with a user. A digital wallet may be associated with, or store, one or more unique asymmetric key pairs, a TAVV, or the like. In at least one embodiment, a digital wallet may store, or otherwise access a token. Such digital wallets may be configured to encrypt transaction information (e.g., account data, etc.) utilizing a private key, a TAVV, a token, or the like.

A "token provisioning request message" may be an electronic message for requesting a token. A token provisioning request message may include information usable for identifying a payment account or digital wallet, and/or information for generating a payment token. For example, a token provisioning request message may include payment credentials, mobile device identification information (e.g. a phone number or MSISDN), a digital wallet identifier, a token requestor identifier, information identifying a tokenization service provider, a merchant identifier, a cryptogram and/or digital signature, and/or any other suitable information.

Information included in a token provisioning request message can be encrypted (e.g., with an issuer-specific key). In some embodiments, a token provisioning request message may be formatted as an authorization request message (e.g., an ISO 8583 message format). In some embodiments, the token provisioning request message may have a zero dollar amount in an authorization amount field. As another example, the token provisioning request message may include a flag or other indicator specifying that the message is a token provisioning request message.

A "token response message" may be a message that responds to a token request. A token response message may include an indication that a token request was approved or denied. A token response message may also include a payment token, mobile device identification information (e.g. a phone number or MSISDN), a digital wallet identifier, token requestor identifier, information identifying a tokenization service provider, a merchant identifier, a cryptogram and/or a digital signature, and/or any other suitable information. Information included in a token response message can be encrypted (e.g., with an issuer-specific key). In some embodiments, a token response message may be formatted as an authorization response message (e.g., an ISO 8583 message format). In some embodiments, the token response message may have a zero dollar amount in an authorization amount field. As another example, the token response message may include a flag or other indicator specifying that the message is a token response message.

A "user" may include an individual. In some embodiments, a user may be associated with one or more personal accounts and/or mobile devices. The user may also be referred to as a cardholder, account holder, or consumer.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a resource provider computer. An access device may generally be located in any suitable location, such as at the location of a resource provider (e.g., a merchant). An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may include a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also include additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also include "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "user device" may be an electronic device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. The user device may include any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may include one or more computational apparatuses and may use any of a variety of computing structures, arrangements, and compilations for servicing the requests from one or more client computers.

A "processor" may refer to any suitable data computation device or devices. A processor may include one or more microprocessors working together to accomplish a desired function. The processor may include CPU includes at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may include a non-transitory computer readable medium that stores instructions that can be executed by a processor to implement a desired method. Examples of memories may include one or more memory chips, disk drives, etc. Such memories may operate using any suitable electrical, optical, and/or magnetic mode of operation.

Details of some embodiments of the present invention will now be described.

In the world of electronic payments, it is desirable to securely transfer a consumer's sensitive account information. Accordingly, many systems have introduced the use of payment tokens that act as a unique digital identifier in lieu of PAN or other account information. A payment token (hereinafter referred to as a token) may be used to conduct electronic transactions without exposing actual account details that could potentially become compromised. In conventional systems, a token requestor (e.g., a merchant, a wallet application, a gateway, etc.) may need to be authenticated prior to having a token provisioned. Authentication may have been traditionally handled by the token provider. However, the authentication effort may place a heavy computational burden on the token provider. In some cases, the token provider may not have any previous relationship with the token requestor to leverage during authentication. In conventional techniques, a token provider may additionally be required to generate and store a shared secret (e.g., a TAVV) and provide the shared secret to the token requestor. This too places a computational burden on the token provider to generate, manage, and provide such shared secrets to various token requestors. The embodiments of the present invention provide techniques for reducing the computational burden on the token provider.

Distributing Tokens

There is a need to leverage existing entities and infrastructure to authenticate token requestors prior to provisioning and distributing tokens to such requestors. In at least one embodiment, a registration authority (e.g., an acquirer and/or payment gateway separate from the token provider) may be utilized to authenticate a token requestor and to distribute security credentials. In at least one embodiment, requesting and distributing security credentials may leverage existing ISO channels.

FIG. 1 shows this high-level concept. FIG. 1 shows a token requestor (e.g., a merchant, a wallet application, etc.) 10, a registration authority 20 (e.g., an acquirer), and a certificate authority 30 (e.g., a payment processor and/or a token service). Although the certificate authority 30 and the registration authority 20 are shown as separate entities, they can be the same entity in other embodiments.

In step 1, the token requestor 10 may generate a public and a private key and may generate a Certificate Signing Request (CSR). The CSR may include any suitable identification information of the requestor and the generated public key. For example, the CSR may include a business ID/Tax ID, an acquirer ID, a merchant ID (MID), terminal ID (TID), and the public key. In some embodiments, the CSR may additionally or alternatively include a billing address, a corporation certificate identifier, information related to a business plan, owner information, credit limit information, and the like. The token requestor 10 may transmit the CSR to the registration authority 20.

In step 2, the registration authority 20 may perform any suitable authentication techniques in order to authenticate the token requestor. For example, the registration authority 20 may perform a know your customer (KYC) process to authenticate the token requestor 10. A "know your customer process" may include any suitable process for an entity to verify the identity of its clients. One purpose of KYC processes is to prevent financial institutions from being used, intentionally or unintentionally, by criminal elements for money laundering activities. KYC processes may include verifying a customer policy, verifying a customer's identification, monitoring customer transactions, and providing risk management. For purposes of KYC processes, a customer is intended to refer to a person or entity that maintains an account and/or has a business relationship with the entity employing the KYC process. In some embodiments, an acquirer may be the registration authority 20 and a merchant, having an account with the acquirer, may be the token requestor 10. Accordingly, the acquirer may verify the merchant using the merchants billing address, the merchants corporation certificates, the merchant's name or ID, the owner information, or any of the information provided in the CSR. In at least one embodiment, the acquirer is well suited to authenticate the merchant because of the ongoing business relationship between the acquirer and the merchant.

In step 3, the certificate authority 30 may receive the certificate signing request and authenticate the request that came from the registration authority 20. In some examples the certificate authority may be a payment processing network and/or a token service. The certificate authority 30 may have a direct relationship with the registration authority 20 (e.g., an acquirer) but may not typically interact with the token requestor 10. Accordingly, in some embodiments, the registration authority 20 may be trusted by the certificate authority 30 more readily than the token requestor 10. In at least one example, the certificate authority may generate a TRID (token requestor ID), and sign the CSR. The TRID may be used to provide a unique identifier for the token requestor and may include any suitable alphanumeric value. In at least one embodiment, the certificate authority 30 may maintain a mapping or other association between the TRID and the public key/certificate signing request of the token requestor 10. In at least one embodiment, after the registration authority 20 is verified and the TRID generated, the certificate authority 30 may return a digital certificate such as an X509 certificate to the registration authority 20. The signed CSR may also be sent with the TRID.

In step 4, the registration authority 20 may return the signed certificate and the TRID back to the token requestor 10. Receipt of the signed certificate and the TRID may notify the token requestor 10 that it may now utilize its private key and TRID to request a token, exchange a token, or transact with a previously-obtained token. Subsequent transactions and/or requests provided by the token requestor 10 may be digitally signed using the TRID and the private key.

Data Elements and Digital Signatures

Embodiments of the invention improve conventional techniques by moving the generation of the cryptogram to the token requestor (e.g., a merchant, a wallet application, etc.). For example, a token service may no longer be required to generate a shared secret, rather the token requestor may be expected to generate a public/private key pair, submit a certificate signing request that includes the public key, in order to obtain a TRID. Once a TRID is obtained, the token requestor may request a token, exchange a token, and/or perform transactions with a previously-obtained token. To provide a secure means of verifying message integrity and authenticity, the token requestor may be required to digitally sign each electronic message. These techniques can be simple for token requestors to implement and at the same time satisfy security requirements. In embodiments of the invention, the token requestor (e.g., a merchant) may utilize a signed hash in each message transmitted (e.g., authorization request messages, token provisioning request messages, etc.).

Figure 2:
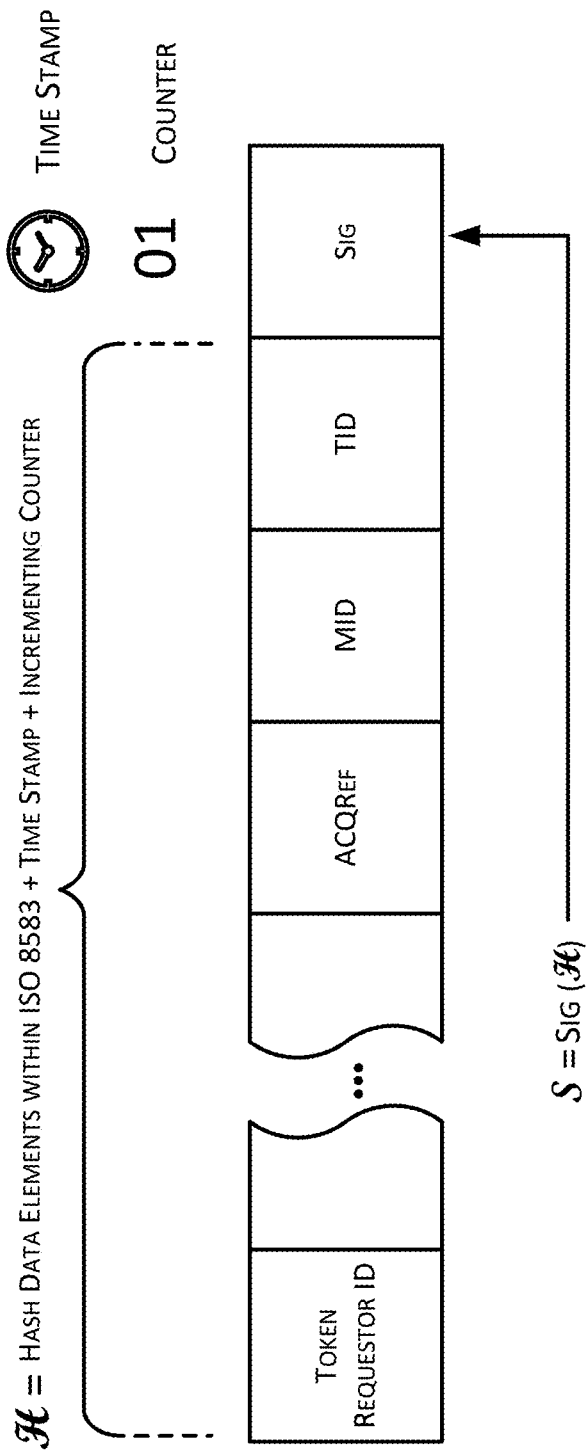
FIG. 2 shows a diagram of a signed hash of data elements.

FIG. 2 shows a diagram of a signed hash of data elements. The signed hash may be utilized by the token requestor (e.g., the merchant) as a digital signature. According to at least one embodiment, the token requestor may utilize the depicted fields to generate a hashed value. For example, the token requestor ID (e.g., the TRID received from the certificate authority of FIG. 1), an acquirer institution ID, a merchant ID, a terminal ID, a timestamp (e.g., in seconds), a counter, or any suitable combination of the above, may be utilized by the token requestor as input into a hashing algorithm in order to produced a hashed value. In at least one embodiment, the hashed value may be signed with the token requestor's private key and the produced digital signature inserted into an ISO 8583 message (e.g., an authorization request message).

In at least one embodiment, digital signatures produced by the techniques outlined above may provide a number of advantages. For example, the digital signature may be utilized for authentication purposes to verify that the digital signature was produced by the token holder (e.g., the merchant, the wallet application, etc.). By utilizing digital signatures over a secure channel between the token requestor (e.g., the merchant), the registration authority (e.g., the acquirer), and the certificate authority (e.g., the payment processor and/or token provider), confidentiality of the token holder's sensitive information (e.g., account number) is maintained. Digital signatures provide the ability to verify the integrity of the message provided by the token holder (e.g., the authorization request, the token provisioning request message, etc.).

In at least one embodiment, utilizing an incrementing counter to produce the digital signature enables a verifiable means to determine whether the received message has been repeated or replayed For example, the message recipient (e.g., the certificate authority 30, the payment processor, the token provider, etc.) may utilize to the digital signature to check whether the count is incrementing. If the message recipient determines that the counter includes a value that has been previously received, or is not an expected value, the message may be identified as one that may be fraudulent (e.g., a part of a replay attack).

In at least one embodiment, utilizing a time stamp within the digital signature may ensure that messages are not intercepted and/or delayed, which may further aid the message recipient in determining whether the message has been altered.

Techniques for Token Provisioning

FIG. 3 shows a flowchart illustrating a process for provisioning a token in a system that includes a resource provider computer 12, a transport computer 22, a token provider computer 33, and an authorization computer 40. In at least one example, the resource provider computer 12 may be operated by, or on behalf of, the token requestor 10 of FIG. 1 (e.g., a merchant). In at least one example, the transport computer 22 may be operated by, or on behalf of, the registration authority 20 of FIG. 1 (e.g., an acquirer). In at least one example, the token provider computer 32 may be operated by, or on behalf of, the certificate authority 30 of FIG. 1 (e.g., a payment processing network, a token provider, etc.). In at least one example, the authorization computer 40 may be operated by, or on behalf of an issuer (e.g., a financial institution associated with the PAN).

In step 311, a sensitive information (e.g., a PAN) is obtained by the resource provider computer 12 (the merchant) from a user device or a COF data store. The resource provider computer 12 may generate a digital signature utilizing its private key in the manner discussed above in connection with FIG. 2. The resource provider computer 12 may insert the digital signature in a token provisioning request and submit the token provisioning request message to the transport computer 22 (e.g., an acquirer associated with the merchant). The token provisioning request message may also include some or all of the data elements discussed in connection with FIG. 2, as encrypted or unencrypted data fields. The token provisioning request message may be in the form of an authorization request message in some embodiments of the invention.

In step 312, the transport computer 22 may authenticate the resource provider (e.g., the merchant). For example, the transport computer 22 may extract from the token provisioning request message various data fields (e.g., a merchant ID, a terminal ID, etc.). The transport computer 22 may utilize the extracted information to verify the resource provider against stored information (e.g., past transaction information, account data, business plans, owner information, etc.). If the extracted information of the token provisioning request message matches the stored information, the transport computer 22 may determine that the token provisioning request is authentic and that the request has been initiated from the resource provider (e.g., the merchant).

Upon authenticating the resource provider in step 312, the transport computer 22 may insert a transport ID (e.g., an ACQRef from FIG. 2) into the token provisioning request message at step 313. The transport ID may be utilized by a token provider as an indication that the transport computer 22 has authenticated the resource provider (e.g., the merchant).

In step 314, after the token provider computer 32 (e.g., the certificate authority 30 of FIG. 1) receives the token provisioning request message, it can use the TRID to look up the public key to verify the digital signature contained in the token provisioning request message. The TRID and the public key may be maintained in a data store accessible to the token provider computer 32. In some examples, the data store is maintained by the token provider computer 32 or the certificate authority 30 of FIG. 1. In at least one embodiment, the token provider computer 32 is operated by the certificate authority 30. Upon retrieving the public key associated with the TRID, the token provider computer 32 may utilized the public key to decrypt the digital signature. The decrypted digital signature may be utilized to verify the data fields of the token provisioning request message. If the decrypted digital signature matches the data fields of the token provisioning request message, then the token provider computer 32 may determine that the token provisioning request message is valid and has been initiated by the resource provider.

In step 315, the token provider computer 32 may generate, or otherwise obtain, a token. The token provider computer 32 may associate the token with the TRID and may maintain a record of the association. The token provider computer 32 may return the TRID and the token to the transport computer 22. In at least one embodiment, the transport computer 22 may be configured to forward the token and the TRID to the resource provider computer 12.

In step 316, the token provider computer 32 may optionally send a notification to an authorization computer 40 (e.g., an issuer). The notification may be utilized to inform an issuer that a token was generated for the PAN and provisioned to a particular TRID.

By way of example, a user of an electronic device may enter account information (e.g., a PAN) into a webpage provided by a merchant computer. The merchant computer, after registering with a certificate authority as described above, may exchange the PAN with a token utilizing a token provisioning request message. Subsequent transactions may be initiated by the merchant computer for the user using the token and a digital signature generated by merchant computer. Such transactions would no longer require inclusion of the PAN.

Techniques for Token Exchange

FIG. 4 shows a flowchart illustrating a process for exchanging tokens.

In step 411, resource provider computer 12 (operated by or on behalf of a merchant) may obtain a token and a cryptogram from, for example, an electronic device (e.g., a mobile phone, a POS terminal operated by the resource provider, or the like). By way of example, a wallet application operated by a consumer may submit a token and TAVV to the resource provider computer 12 as part of a financial transaction. In at least one embodiment, the resource provider computer 12 may submit the wallet token and the cryptogram in a token provisioning request message with a digital signature generated by the resource provider computer 12 in accordance with the techniques discussed above. The token provisioning request may also include some or all of the data elements described in connection with FIG. 2, as encrypted or unencrypted fields. The digital signature is discussed above with reference to FIG. 2.

In step 412, the transport computer 22 may authenticate the resource provider (e.g., the merchant). For example, the transport computer 22 may extract from the token provisioning request message various data fields (e.g., a merchant ID, a terminal ID, etc.). The transport computer 22 may utilize the extracted information to verify the resource provider against stored information (e.g., past transaction information, account data, business plans, owner information, etc.). If the extracted information of the token provisioning request message matches the stored information, the transport computer 22 may determine that the token provisioning request is authentic and that the request has been initiated from the resource provider (e.g., the merchant).

Upon authenticating the resource provider in step 312, the transport computer 22 may insert a transport ID (e.g., an ACQRef from FIG. 2) into the token provisioning request message at step 413. The transport ID may be utilized by a token provider as an indication that the transport computer 22 (e.g., the acquirer) has authenticated the resource provider (e.g., the merchant).

In step 414, after the token provider computer 32 (e.g., the certificate authority 30 of FIG. 1) receives the token provisioning request message, it can use the TRID to look up the public key to verify the digital signature contained in the token provisioning request message. The TRID and the public key may be maintained in a data store accessible to the token provider computer 32. In some example, the data store is maintained by the token provider computer 32 or the certificate authority 30 of FIG. 1. In at least one embodiment, the token provider computer 32 is operated by the certificate authority 30. Upon retrieving the public key associated with the TRID, the token provider computer 32 may utilized the public key to decrypt the digital signature. The decrypted digital signature may be utilized to verify the data fields of the token provisioning request message. If the decrypted digital signature matches the data fields of the token provisioning request message, then the token provider computer 32 may determine that the token provisioning request message is valid and has been initiated by the resource provider. The token provider computer 32 may further verify that the cryptogram (e.g., the wallet token) has been provisioned to the wallet application. Accordingly, the token provider computer 32 may authenticate both the customer (operating the electronic device) and the merchant.

In step 415, the token provider computer 32 may generate, or otherwise obtain, a second token. The token provider computer 32 may associate the second token with the TRID and may maintain a record of the association. The token provider computer 32 may return the TRID and the second token to the transport computer 22. In at least one embodiment, the transport computer 22 may be configured to forward the token and the TRID to the resource provider computer 12.

In step 416, the token provider computer 32 may optionally send a notification to an authorization computer 40 (e.g., an issuer). The notification may be utilized to inform an issuer that the second token was generated for the PAN and provisioned to a particular TRID.

In at least one embodiment, resource providers (e.g., merchants) can obtain their own tokens or accept tokens from other token domains. For example, a merchant can obtain tokens directly from the token provider and may also accept tokens from wallet applications. In some examples, tokens generated by the token provider may be associated with a different token domain than the token provided by the wallet application. It may be desirable for the resource provider to exchange the token provided by the wallet for one that is generated by the token provider for the merchant.

The process discussed above in connection with FIG. 4 may be utilized to accomplish such a goal.

By way of example, a user of an electronic device (e.g., a consumer) may initiate a transaction via a wallet application operating on the electronic device. In at least one example, the wallet application may submit token information (e.g., a token stored by the wallet application, hereinafter "a wallet token") via a POS terminal of a merchant. The wallet application (or the POS terminal) may submit the wallet token to a merchant computer (e.g., an example of the resource provider computer 12). In at least one example, a cryptogram (e.g., a TAVV) may be included in the token information and submitted with the wallet token. The merchant computer, after registering with a certificate authority (e.g., a payment processing network, a token provider, etc.) as described above in connection with FIG. 1, may exchange the wallet token for a new token associated with the merchant utilizing a token provisioning request message. For example, the merchant computer may insert the wallet token (in some cases the TAVV) and a digital signature generated by the merchant computer in a token provisioning request message in accordance with the process described in connection with FIG. 2.

Subsequent transactions may be initiated by the merchant computer for the user using the new token and a digital signature generated by merchant computer. Such transactions would no longer require inclusion of the wallet token.

Crossing Different Token Domains

In the above use case, the consumer may have initiated the transaction from a trusted entity (SE, HCE) with a cryptogram and the new token needs to be generated to traverse token domains. In at least one embodiment, the token provider computer 32 may enforce domain restrictions ensuring that higher security tokens (e.g., SE and/or HCE) are not exchanged for lower security tokens (e.g., COF). For example, the table below shows how tokens can be exchanged.

|  | Subsequent Domain | Secure Element (SE) | Host Card Emulation (HCE) | Card on File (COF) |
| --- | --- | --- | --- | --- |
| Initial Domain | Secure Element (SE) | NO | NO | YES |
|  | Host Card Emulation (HCE) | NO | NO | YES |
|  | Card on File (COF) | NO | NO | NO |

FIG. 5 shows a flowchart with a token processing flow.

In step 511, the resource provider computer 12 (operated by or on behalf of a merchant) may obtain a token on file and may submit a merchant initiated transaction (MIT) that includes a digital signature generated by the resource provider computer 12. The MIT may be formatted as an authorization request message that may include some or all of the data elements discussed in connection with FIG. 2, as encrypted and/or unencrypted data fields.

In step 512, the transport computer 22 (e.g., an acquirer) may authenticate the resource provider. For example, the transport computer 22 may extract a merchant ID and a terminal ID from the MIT/authorization request message and compare the extracted information to stored information associated with the resource provider. It should be appreciated that although a MID and TID are used in this example to authenticate a merchant, any suitable data included in the MIT/authorization request message may be similarly utilized.

In step 513, if the MID and TID (or appropriate extracted data) matches stored data associated with the resource provider, the transport computer 22 may insert a transport ID (e.g., the ACQRef of FIG. 2) to provide an indication that the resource provider has been authenticated. The transport computer 22 may then forward the MIT/authorization request message on to the token provider computer 32 (e.g., operated by, or on behalf of, a payment processing network).

In step 514, the token provider computer 32 may use the received TRID to look up a public key to verify the digital signature contained in the MIT/authorization request message. If the data contained in the decrypted digital signature matches the corresponding data fields of the MIT/authorization request message, then the token provider computer 32 may perform a token to PAN translation and the token may be replaced with the corresponding PAN in the MIT/authorization request message.

In step 515, an authorization request process is continued as the token provider computer 32 forwards the authorization request message containing the PAN to the authorization computer 40 (e.g., an issuer associated with the PAN). At step 516, the authorization computer may return an authorization response message (e.g., approving or denying the transaction) to the resource provider computer 12 via the token provider computer 32 and the transport computer 22 as depicted in FIG. 5. In at least one embodiment, the PAN may be translated back to the token in the authorization response message at the token provider computer 32.

At the end of the day, or at another suitable time, a clearing and settlement process may take place between the authorization computer 40 and the transport computer 22.

Limited Token Address Space Considerations

Figure 6:
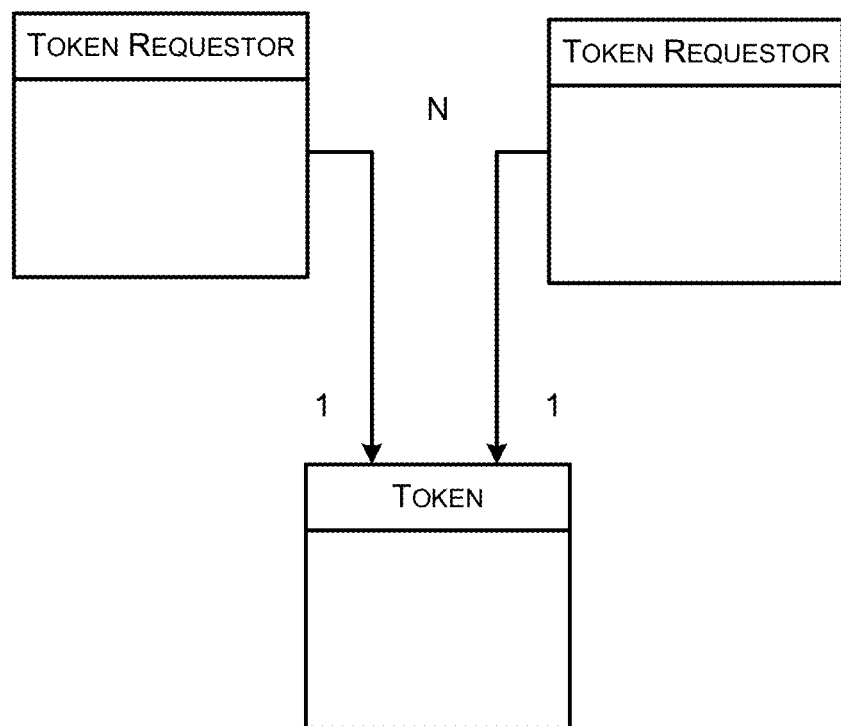
FIG. 6 shows a diagram illustrating the re-use of tokens within a token domain.

FIG. 6 shows a diagram illustrating the re-use of tokens within a token domain.

By narrowing domain restrictions to the resource provider level (e.g., a merchant level), a breach can be greatly contained because the token can only be used at a particular resource provider. However, a large pool of token space may be necessary. In some embodiments, it may be possible to allocate #PAN X #merchant.

If the number of tokens exceeds the available space, it is possible to re-use tokens within a token domain (COF). The techniques described herein enable tokens to be reused by requiring the resource provider to provide a digital signature with every message. Since tokens require a digital signature to perform a function, it is possible to revoke the certificate of the affected resource provider without disrupting token utilization of other resource providers.

Figure 7:
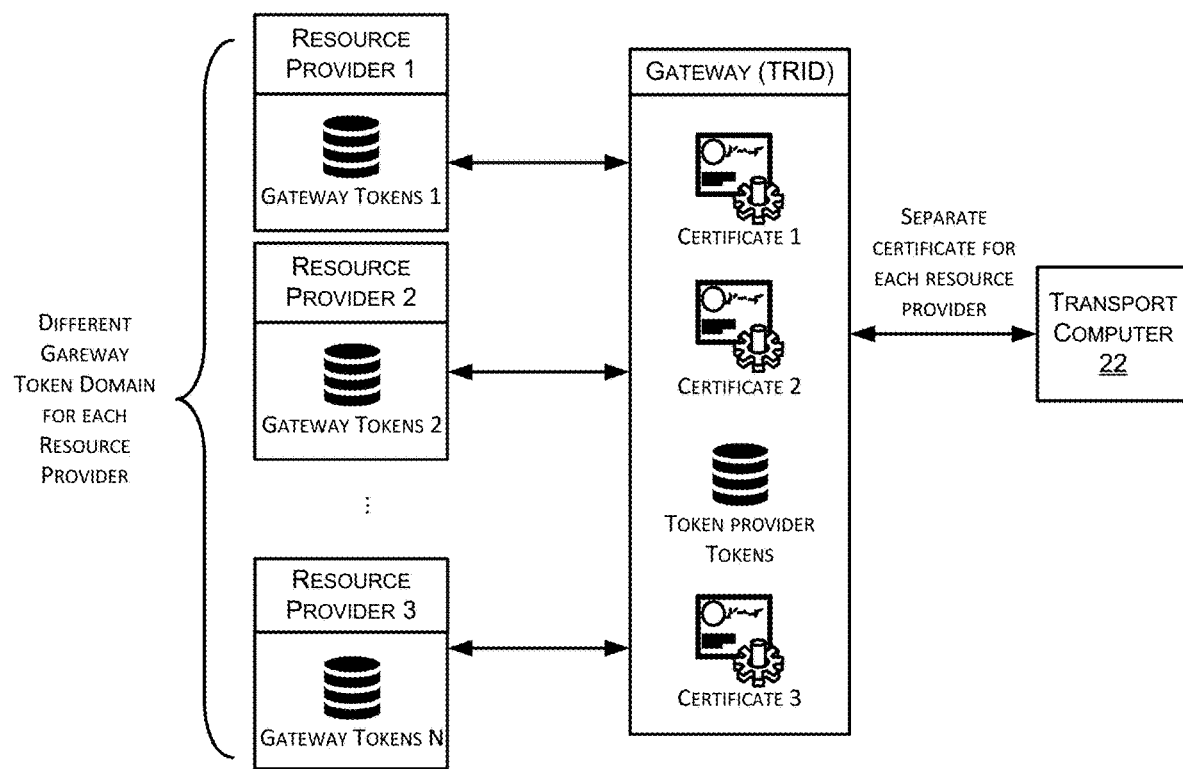
FIG. 7 shows a diagram illustrating an environment for reusing tokens within a token domain.

FIG. 7 shows a diagram illustrating an environment for reusing tokens within a token domain. In the example depicted by FIG. 7, a gateway computer may act as a token requestor on behalf of one or more resource providers (e.g., merchants). The gateway may receive a CSR from a resource provider, and submit a token provisioning request message on behalf of the resource provider in a similar manner as described above. Upon receiving a token issued by a token provider (e.g., the token provider computer 32 via the transport computer), the gateway may issue a unique gateway token to the resource provider. The gateway may utilize the same token provided by the token provider for multiple resource providers in order to provide messages (e.g., authorization request messages) on behalf of the resource providers. If a breach is determined, the certificate corresponding to the affected resource provider may be revoked without affect the transactions of the unaffected resource providers. By enabling a single token (token provider token) to be reused on behalf of multiple resource providers, the available token space may be optimally utilized.

Figure 8:
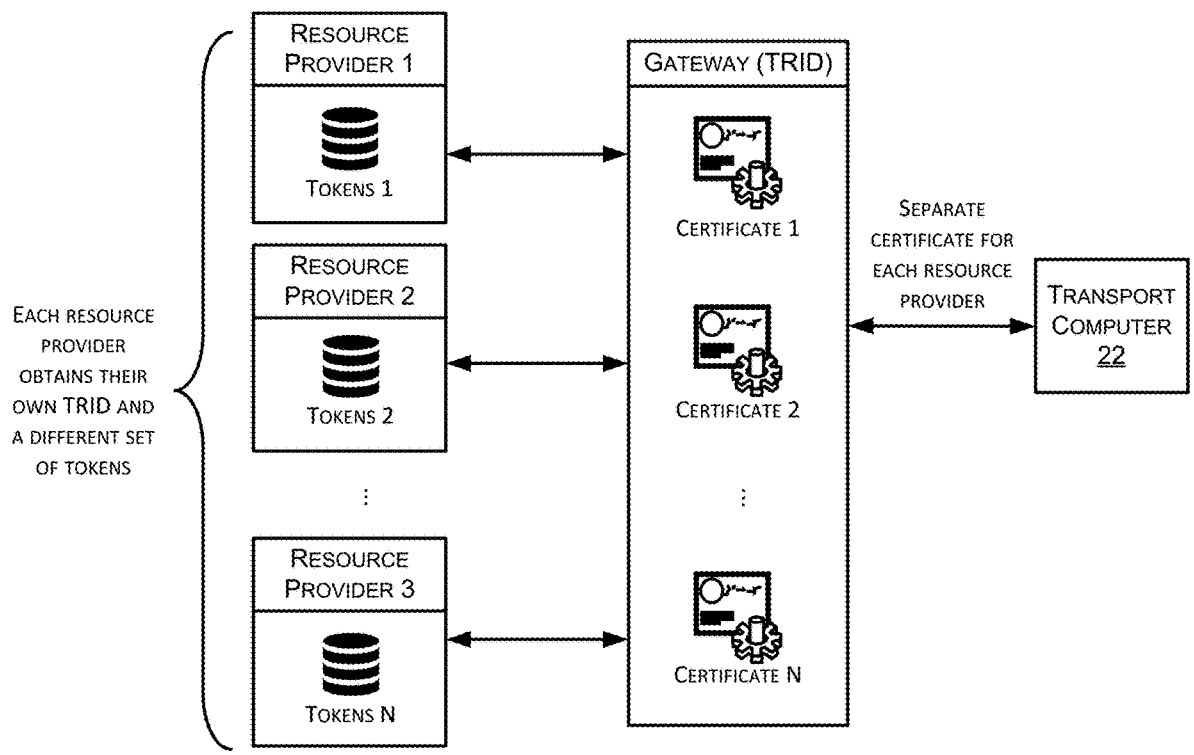
FIG. 8 shows a diagram illustrating an environment in which unique tokens are utilize by resource providers.

FIG. 8 shows a diagram illustrating an environment in which unique tokens are utilize by resource providers. In the example depicted by FIG. 8, a gateway computer may act as a token requestor on behalf of one or more resource providers (e.g., merchants). The gateway may receive and maintain unique certificates for each resource provider. In at least one embodiment, the gateway may sign each transaction originating from a particular resource provider with the certificate uniquely assigned to the particular resource provider.

Routing to Multiple Registration Authorities

Figure 9:
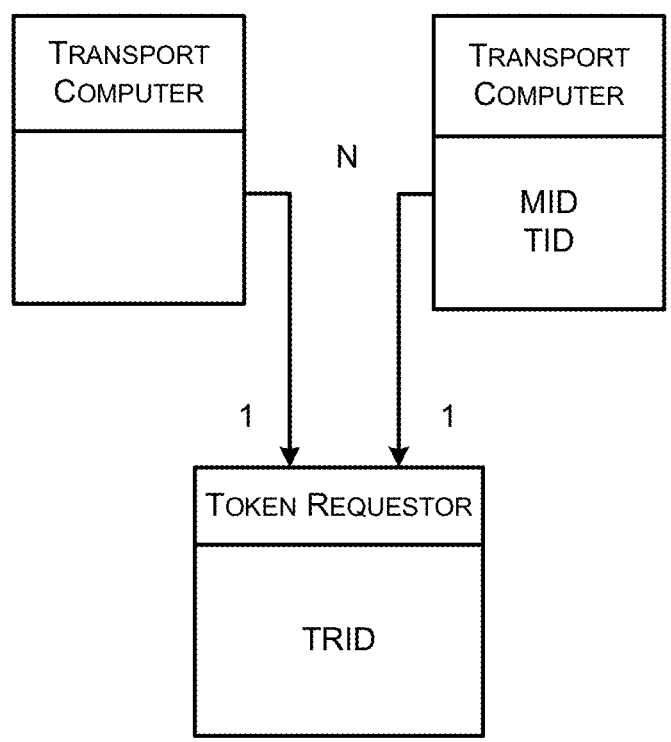
FIG. 9 shows another diagram illustrating a re-use of a token requestor ID.

FIG. 9 shows a diagram illustrating a re-use of a token requestor ID.

After obtaining a token (e.g., from the token provider computer 32), a resource provider may wish to route a transactions over different transport computers (e.g., operated by, or on behalf of different acquirers) because the resource provider may operate globally in different countries. Resource providers (or gateways signing messages on behalf of a resource provider) may need to register with each transport computer they wish to route their tokens through. FIG. 9 shows a relationship between a token requestor (e.g., a resource provider computer associated with a merchant) and multiple transport computers. It should be appreciated that the transport computers depicted in FIG. 9 are intended to illustrate transport computers that are operated by different entities.

Figure 10:
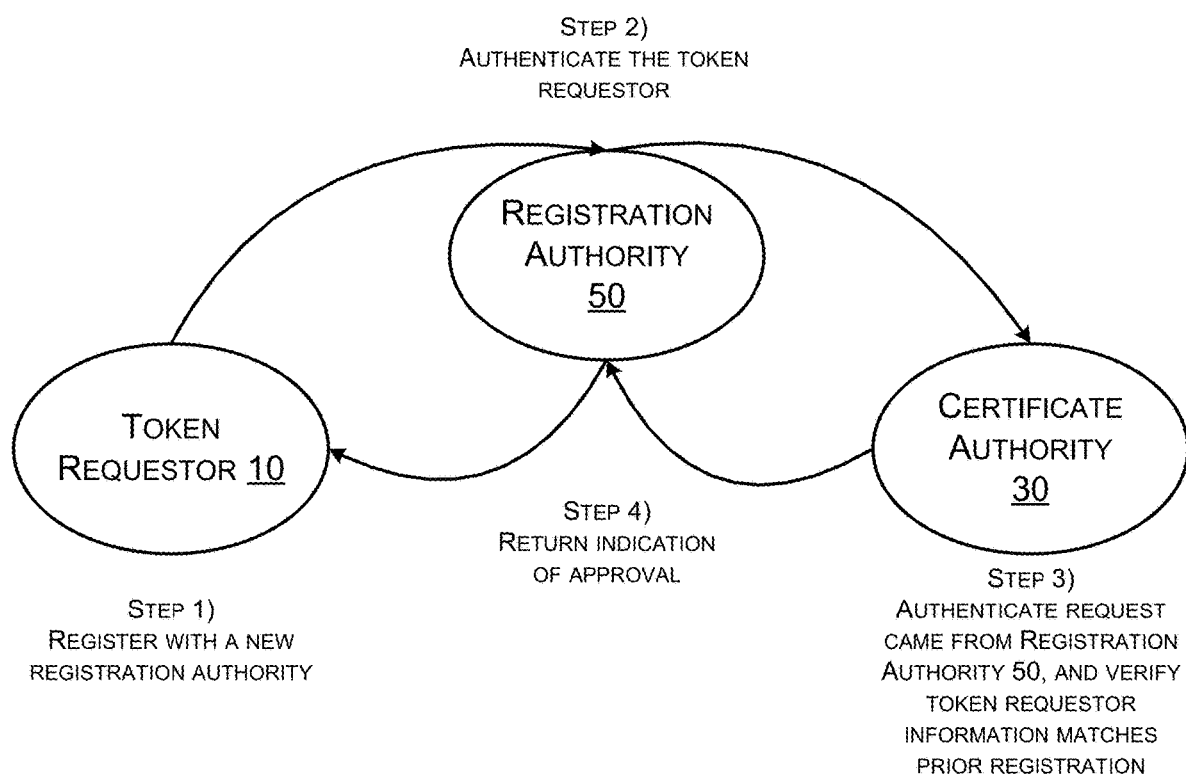
FIG. 10 shows a diagram that illustrates a registration matching process.

FIG. 10 shows a diagram that illustrates a registration matching process.

In step 1, the token requestor 10 may register with a registration authority 50. The registration authority 50 may be operated by a different entity than the entity that operates registration authority 20 of FIG. 1. In at least one embodiment, the token requestor 10 generates a public/private key pair and a CSR as described above. The CSR may be sent to the registration authority 50. The CSR may contain information such as, but not limited to, a merchant name, a business ID/tax ID, an acquirer ID, a merchant ID (MID), a terminal ID, and a public key.

In step 2, the registration authority 50 may authenticate the token requestor in a similar manner as described above in connection with the registration authority 20 of FIG. 1.

In step 3, the certificate authority 30 may receive the CSR from the registration authority 50. In at least one embodiment, the certificate authority 30 may authenticate that the CSR came from the registration authority 50 and verifies the information contained in the CSR matches information contained in a prior registration (e.g., a previously received CSR associated with the token requestor 10). If the information matches the prior registration, the certificate authority 30 may return an indication of approval at step 4. The approval may be returned to the token requestor 10 via the registration authority 50 in a similar manner as described above in connection with FIG. 1.

Technical Benefits

Embodiments of the present invention reduce the computational burden of token providers by delegating authentication efforts to other entities (e.g., acquirers), in effect, leveraging pre-existing relationships between registration authorities (e.g., acquirers) and token requestors (e.g., merchants). Additionally, key generation efforts are delegated to token requestors (e.g., merchants) which may further relieve the computational burden on the token provider. Embodiments of the invention ensure that the entity submitting the token transaction has authority or ownership of the token. By utilizing the techniques described herein, confidentiality of sensitive data is maintained. By utilizing tokens and the digital signatures described herein, the integrity of a message may be verified. Because the digital signatures herein are generated using the particular data fields described above, fraudulent transactions may be detected (e.g., replay attacks, masquerades, reordering of messages, insertion/deletion of messages, etc.). Accordingly, tokens may be provisioned and distributed with less computational cost to the token provider.

The various participants and elements described herein may operate one or more computer apparatuses to facilitate the functions described herein. Any of the elements in the above-described FIG. 1, including any servers or databases, may use any suitable number of subsystems to facilitate the functions described herein.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software. Any of the above mentioned entities may operate a computer that is programmed to perform the functions described herein.

Examples of such subsystems or components may be interconnected via a system bus. Additional subsystems such as a printer, keyboard, fixed disk (or other memory including computer readable media), monitor, which is coupled to display adapter, and others may be included. Peripherals and input/output (I/O) devices, which couple to I/O controller (which can be a processor or other suitable controller), can be connected to the computer system by any number of means known in the art, such as a serial port. For example, the serial port or an external interface can be used to connect the computer apparatus to a wide area network such as the Internet, a mouse input device, or a scanner. The interconnection via system bus allows the central processor to communicate with each subsystem and to control the execution of instructions from system memory or a fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

Additional Embodiments

Another embodiment of the invention is directed to a method for providing secure token-based transactions. The method may include generating, at a resource provider computer, a certificate signing request. The method may further include transmitting the certificate signing request to a registration authority computer. In at least one embodiment, receipt of the certificate signing request may cause the registration authority computer to authenticate the resource provider associated with the resource provider computer. The method may further include receiving, from the registration authority computer, a token requestor identifier (ID) and a signed certificate, the token requestor ID and the signed certificate being assigned to the resource provider. In some embodiments, the method may further include, storing the token requestor ID. In at least one embodiment, the token requestor ID may be utilized by the token requestor computer to generate digital signatures for subsequent token-based transactions.

Another embodiment of the invention is directed to a resource provider computer that includes a processor, and a computer readable medium coupled to the processor, the computer readable medium including code, executable by the processor, for implementing a method. The method may include generating a certificate signing request. The method may further include transmitting the certificate signing request to a registration authority computer. In at least one embodiment, receipt of the certificate signing request may cause the registration authority computer to authenticate the resource provider associated with the resource provider computer. The method may further include receiving a token requestor identifier (ID) and a signed certificate, the token requestor ID and the signed certificate being assigned to the resource provider. In some embodiments the method may further include, storing the token requestor ID. In at least one embodiment, the token requestor ID may be utilized by the token requestor computer to generate digital signatures for subsequent token-based transactions.

Another embodiment of the invention is directed to a method including receiving, a first payment token. The method may further include transmitting a token request message to a token service computer using the first payment token, wherein the token service computer generates a second payment token in response to receiving the first payment token. The method may further include receiving the second payment token from the token service computer. In at least one embodiment, the first payment token may be associated with a first token domain and the second payment token may be associated with a second token domain. In at least one embodiment, the first token domain may be associated with a same or lesser security restriction than the second token domain. In at least one embodiment, the second payment token is a card on file (COF) token associated with a resource provider (e.g., a merchant). In at least one embodiment, the method further includes receiving (e.g., by a registration authority computer) an authorization request message including the first payment token, modifying the authorization request message by replacing the first payment token with the second payment token, and transmitting the modified authorization request message to a payment processing computer. In at least one embodiment, the token provisioning request message may be routed through a transport computer prior being received by the token provider computer. In some embodiments, the transport computer may authenticate an identify of the resource provider. In at least one embodiment, the token provisioning request message includes the first payment token, a cryptogram associated with the first payment token, and a digital signature generated by a resource provider computer. In at least one embodiment, the token provider computer may generate a token requestor identifier for the resource provider and provides the token requestor identifier with the second payment token. In at least one embodiment, the token requestor identifier may be utilized by a resource provider computer to provide a digital signature in a future authorization request message.

What is claimed is:
1. A computer-implemented method comprising:
receiving, at a registration authority computer, a certificate signing request from a token requestor computer associated with a token requestor, with respect to a user who requested an interaction with the token requestor;
in response to the receiving the certificate signing request, authenticating, by the registration authority computer, the token requestor;
adding an indication to the certificate signing request that the registration authority computer has authenticated the token requestor;
transmitting, by the registration authority computer to a certificate authority computer, the certificate signing request comprising the indication, the certificate authority computer being remote with respect to the registration authority computer;
receiving, by the registration authority computer from the certificate authority computer, a token requestor identifier (ID) for the token requestor;
transmitting, by the registration authority computer, the token requestor ID to the token requestor computer;
receiving, by the registration authority computer from the token requestor computer, an authorization request message comprising a token obtained by the token requestor by using the token requestor ID, wherein the token includes a payment account identifier as a substitute for an account number of the user who requested the interaction with the token requestor, wherein the payment account identifier is provided in the authorization request message in place of the account number of the user; and
transmitting, by the registration authority computer to the certificate authority computer, the authorization request message comprising the token, wherein the receiving the authorization request message causes the certificate authority computer to convert the payment account identifier of the token to the account number of the user, wherein the token is a first token and the method further comprises:
transmitting, by the registration authority computer to the certificate authority computer, a token request message using the first token;
receiving, by the registration authority computer from the certificate authority computer, a second token; and
transmitting, by the registration authority computer to the token requestor computer, the second token, wherein receiving the certificate signing request causes the certificate authority computer to:
verify that the registration authority computer authenticated the token requestor based at least in part on determining that an identifier associated with the registration authority computer is included in the certificate signing request;
in response to the verifying the registration authority computer authenticated the token requestor, generate the token requestor ID for the token requestor; and
store a mapping between the token requestor ID and a public key generated by and received from the token requestor computer.

2. The computer-implemented method of claim 1, wherein the authenticating the token requestor comprises executing a know-your-customer process to authenticate the token requestor.

3. The computer-implemented method of claim 1, further comprising:
prior to the receiving by the registration authority computer from the token requestor computer the authorization request message, receiving, by the registration authority computer from the token requestor computer, a token provisioning request message comprising the token requestor ID, a digital signature generated by the token requestor computer using the token requestor ID, and information indicating that a message is the token provisioning request message;
transmitting, by the registration authority computer, the token provisioning request message to the certificate authority computer, wherein receiving the token provisioning request message causes the certificate authority computer to retrieve the public key of the token requestor ID and verify the digital signature using the public key;
in response to the digital signature being verified, receiving, by the registration authority computer from the certificate authority computer, a token response message comprising the first token issued to the token requestor and information indicating that a message is the token response message responsive to the token provisioning request message; and
transmitting the first token to the token requestor computer.

4. The computer-implemented method of claim 3, wherein the token provisioning request message further comprises an identifier associated with the registration authority computer, a terminal identifier, a time stamp, and a message counter.

5. The computer-implemented method of claim 3, further comprising notifying an authorization computer that the first token has been provisioned to the token requestor, the authorization computer being associated with the account number of the user.

6. The computer-implemented method of claim 3, wherein receiving the token provisioning request message causes the certificate authority computer to decrypt the digital signature to generate decrypted information and compare the decrypted information to one or more data fields of the token provisioning request message.

7. The computer-implemented method of claim 1, further comprising:
receiving, by the registration authority computer, an authorization response message corresponding to the authorization request message; and
transmitting, by the registration authority computer to the token requestor computer, the authorization response message.

8. A registration authority computer comprising:
a processor; and
a non-transitory computer readable storage medium storing code that, when executed by the processor, causes the processor to perform a method including:
receiving a certificate signing request from a token requestor computer associated with a token requestor, with respect to a user who requested an interaction with the token requestor;
in response to the receiving the certificate signing request, authenticating the token requestor;
adding an indication to the certificate signing request that the token requestor is authenticated;
transmitting, to a certificate authority computer, the certificate signing request comprising the indication, the certificate authority computer being remote with respect to the registration authority computer;
receiving, from the certificate authority computer, a token requestor identifier (ID) for the token requestor;
transmitting the token requestor ID to the token requestor computer;
receiving, from the token requestor computer, an authorization request message comprising a token obtained by the token requestor by using the token requestor ID, wherein the token includes a payment account identifier as a substitute for an account number of the user who requested the interaction with the token requestor, wherein the payment account identifier is provided in the authorization request message in place of the account number of the user; and
transmitting, to the certificate authority computer, the authorization request message comprising the token, wherein the receiving the authorization request message causes the certificate authority computer to convert the payment account identifier of the token to the account number of the user,
wherein the token is a first token and the method further includes:
transmitting, to the certificate authority computer, a token request message using the first token;
receiving, from the certificate authority computer, a second token; and
transmitting, to the token requestor computer, the second token,
wherein receiving the certificate signing request causes the certificate authority computer to:
verify that the registration authority computer authenticated the token requestor based at least in part on determining that an identifier associated with the registration authority computer is included in the certificate signing request;
in response to the verifying the registration authority computer authenticated the token requestor, generate the token requestor ID for the token requestor; and
store a mapping between the token requestor ID and a public key generated by and received from the token requestor computer.

9. The registration authority computer of claim 8, wherein the certificate signing request is received and transmitted within the authorization request message that conforms to an ISO 8583 transaction message format.

10. The registration authority computer of claim 8, wherein the method further includes notifying an authorization computer that the first token has been provisioned to the token requestor, the authorization computer being associated with an issuer corresponding to the account number of the user.

11. The registration authority computer of claim 8, wherein the method further includes:
  prior to the receiving, from the token requestor computer, the authorization request message, receiving a token provisioning request message comprising the token requestor ID, a digital signature generated by the token requestor computer utilizing the token requestor ID, and information indicating that a message is the token provisioning request message; and
  transmitting the token provisioning request message to the certificate authority computer, wherein receiving the token provisioning request message causes the certificate authority computer to retrieve the public key of the token requestor ID and verify the digital signature using the public key.

12. The registration authority computer of claim 8, wherein the token provisioning request message is routed through a transport computer prior to being received by the certificate authority computer, and wherein the transport computer authenticates an identity of the token requestor associated with the token provisioning request message.

13. The registration authority computer of claim 8, wherein the second token is associated with a second token domain, and
  the first token is associated with a first token domain, the first token domain being associated with a lesser security restriction than that of the second token domain.

14. The registration authority computer of claim 8, wherein an identifier associated with the registration authority computer is added to the certificate signing request as the indication to the certificate authority computer that the registration authority computer has authenticated the token requestor.

15. The registration authority computer of claim 8, wherein the token requestor ID is received in response to the transmitting, to the certificate authority computer, the certificate signing request.

16. The registration authority computer of claim 8, wherein the certificate signing request comprises the public key.

\* \* \* \* \*